United States Patent [19]

Jamison et al.

[11] 4,454,922

[45] Jun. 19, 1984

[54] DRILL ROD AND DRILLING APPARATUS

[75] Inventors: Will B. Jamison, Bethel Park; Harley G. Pyles, Bridgeville, both of Pa.

[73] Assignee: Consolidation Coal Company, Pittsburgh, Pa.

[21] Appl. No.: 382,375

[22] Filed: May 27, 1982

[51] Int. Cl.³ .............................................. F21B 17/22
[52] U.S. Cl. .................................. 175/323; 175/320; 279/103; 403/359
[58] Field of Search ............... 175/323, 320, 102, 310, 175/388, 394; 15/104.3; 285/175, 176, 330; 279/102, 103, 99, 105, 19; 408/226, 239; 403/361, 359, 383

[56] References Cited

U.S. PATENT DOCUMENTS

| | | | |
|---|---|---|---|
| 260,314 | 6/1882 | parks et al. | 403/359 X |
| 968,471 | 8/1910 | Hardsocg | 175/323 |
| 2,032,196 | 2/1936 | Blake | 287/103 |
| 2,343,319 | 3/1944 | Paget | 279/93 |
| 2,379,984 | 7/1945 | Nereaux | 279/93 |
| 2,438,774 | 3/1948 | Baillie | 279/93 |
| 2,733,943 | 2/1956 | Nater | 175/323 |
| 2,788,234 | 4/1957 | Doyle | 287/103 |
| 2,868,019 | 1/1959 | Bull | 73/421 |
| 3,304,816 | 2/1967 | Galorneau | 77/68 |
| 3,485,520 | 12/1969 | Alexander | 279/102 |
| 3,519,091 | 7/1970 | Leibee et al. | 175/320 |
| 4,099,585 | 7/1978 | Emmerich | 175/320 |
| 4,226,290 | 10/1980 | McSweeney | 175/320 |

OTHER PUBLICATIONS

Fairmont Supply Catalog Entitled, "Kennametal Hex 'Hands-Off' Drill Rod & Accessory Manual".

Primary Examiner—Ernest R. Purser
Assistant Examiner—Thuy M. Bui
Attorney, Agent, or Firm—William A. Mikesell, Jr.; Stanley J. Price, Jr.; John M. Adams

[57] ABSTRACT

A drill rod assembly for use in rotary drilling in a mine roof includes a plurality of releasably engageable drill rod members connected in end to end relation. One end of the assembly receives a cutting bit and the opposite end is drivingly connected to a drill chuck of a drill head. Each drill rod member includes a shank end portion, a socket end portion and a body portion extending between the shank end portion and the socket end portion. The shank end portion of each drill rod member is releasably engageable in the socket end portion of an adjacent drill rod member. The length of the drill rod assembly is progressively expanded to the length required for drilling a bore hole of a preselected depth into a mine roof. The shank end portion of each drill rod member is twisted in a helical pattern forming a plurality of helical faces around the axis of the shank end portion. The socket end portion of each drill rod member has an internal bore formed by a plurality of helical faces. The helical faces of the socket end portion have a lead that corresponds to the lead of the helical faces on the shank end portion. The shank end portion of a drill rod member is insertably received in the socket end portion of an adjacent drill rod member where the respective helical faces are positioned in abutting parallel relation. The application of torque to the drill rod assembly urges the abutting helical faces of the connected drill rod members into increasing frictional engagement to prevent separation of the connected drill rod members as the drill rod assembly is retrieved from the drilled bore hole.

24 Claims, 7 Drawing Figures

DRILL ROD AND DRILLING APPARATUS

BACKGROUND OF THE INVENTION

1. Field of the Invention

This invention relates to a drill rod for rotary drilling apparatus and more particularly to a drill rod assembly formed by a plurality of individual releasably engageable drill rod members that are restrained from separation from one another upon removal of the drill rod assembly from the drilled bore hole.

2. Description of the Prior Art

In underground mining operations, a mine roof is conventionally supported by roof bolts that include an expandable shell positioned in a bore hole drilled in the mine roof and a bearing plate positioned on the roof bolt in contact with the mine roof at the emergent end of the bore hole. Rotating the bolt having an expansion shell positioned on the opposite end thereof expands the shell to engage the rock wall of the bore hole. The bolt is tensioned with the resultant effect of compressing the rock strata to reinforce the strata and thereby prevent roof falls. It is also known to support a rock formation by adhesively bonding an elongated bolt in a bore hole drilled in a mine roof. The bolt is adhesively bonded in position by a thermosetting resin having thixotropic properties.

Vertical bores or bolt holes are drilled in the mine roof by a roof drill that is mounted on the end of a boom of a mobile drilling machine. The boom is connected to the mobile machine so that, as the boom is raised, the roof drill moves in a vertical linear path to drill a substantially vertical bore hole in the mine roof. In many underground mining operations, because of the low seam heights, the roof bolts require a bore of a length greater than the height of the mine roof, i.e. the clearance between the mine roof and floor. Therefore, a drill steel or drill rod is formed by a plurality of interconnected rod sections. The rod sections are progressively added to the drill rod as the bore hole is being developed in the mine roof.

Once the bore hole has been drilled to the required depth in a mine roof, the drill rod assembly or drill steel must be removed from the bore hole for insertion of the roof bolt. In most cases, particularly when drilling in relatively hard rock strata, it is extremely difficult to maintain the drill steel aligned with a vertical axis for drilling a vertical bore hole. Most commonly, the drill steel will penetrate the hard material and be deflected from a precise vertical position. It is also the conventional practice for the operator to steady the drill steel with his hand to start the bore hole. The operator continues to hold the drill steel as it advances into the mine roof to maintain the drill steel in a vertical axis for drilling a bore hole in a straight line. This is a dangerous practice and subjects the drill operator to a substantial risk of injury.

When the drill steel is deflected from a vertical position, it rubs against the side wall of the bore hole. Consequently, as the drill steel is retrieved after the bore hole has been drilled to the desired depth, the friction generated between the drill steel and the wall of the bore hole obstructs withdrawal of the drill steel from the bore hole. For a drill steel formed by a plurality of slidably interconnected male and female sections, the frictional engagement of the sections with the bore hole wall overcomes the engagement of the interconnected sections resulting in separation of one or more of the sections.

One known solution to preventing loss of drill rod sections in a bore hole upon retrieval of the drill rod assembly is the use of pins to connect the adjacent sections. Couplings are also used to connect adjacent drill rod sections, as disclosed in U.S. Pat. No. 3,519,091. A conventional coupling includes a socket end portion and a rod end portion where the socket end portion has a rectangular or hexagonal profile and the shank end portion has a corresponding profile. The shank end portion of a drill rod section also having a hexagonal or rectangular profile is inserted within the receiving socket of the coupling. The drill rod shank end portion may also be provided with a split ring that is compressed when forced into the coupling socket to frictionally engage the shank in the socket. It is also known to utilize a detent mechanism to hold a hexagonal drill rod shank end portion within a mating coupling socket.

U.S. Pat. No. 4,226,290 discloses the connection of adjacent drill rod sections by inserting a male shank within a female socket and aligning a groove in the male shank with a hole in the female socket. A locking wire is positioned in the aligned hole and groove so as to prevent the separation of the connected drill rod sections.

The use of pins and wires to connect sections of a drill rod assembly is considered to be inconvenient in the working environment of an underground mine. Due to the confined working area of an underground mine, the maneuverability of the mine drill is limited, making it difficult to connect drill rod sections by pins and wires. Also, these elements are easily lost, and an adequate inventory must be maintained at the work site. The same applies to couplings for connecting adjacent drill rod sections. Furthermore, the use of any connecting element to join adjacent drill rod sections increases the time to complete the drilling of a bore hole and thus the time the drill operator is exposed to unsupported mine roof.

As disclosed in U.S. Pat. No. 4,226,290, it is known to position various drill rod components in a predetermined order in the drilling of a bore hole. For example, the drill bit is initially attached to the upper end of a starter bar which is positioned in the drill head chuck to initiate drilling of the bore hole. Once the bore hole has been started, the starter bar and drill bit are removed by lowering the drill head and a driver steel component is inserted within the chuck of the drill head. A finisher component, which holds the drill bit, is connected to the driver steel component, and the drilling is continued. As the bore hole is developed, middle extension components are inserted between the driver steel component and the finisher component to achieve the requisite bore height. With this arrangement, a number of distinct drill steel components must be connected in a preselected order to one another by interconnected pins and wires, couplings or the like to form a complete drill rod. This method requires a substantial inventory of distinct components that are not interchangeable.

Therefore, there is need in rotary drilling apparatus for a drill rod formed by a plurality of drill rod sections connected in a manner that resists separation of the sections upon retrieval of the drill rod from the drilled bore hole and facilitates efficient assembly and disassembly of the respective sections. While the known drill rod assemblies include connected components to resist separation of the drill rod sections from one another during retrieval of the drill rod, the known drill rod assemblies require the use of a number of different components which increase the inventory demand and the time for drilling a bore hole. This reduces the mining production by slowing the drilling operation and increases the occupational hazards involved in mine roof drilling.

SUMMARY OF THE INVENTION

In accordance with the present invention, there is provided a drill rod for rotary drilling that includes an assembly of rod members and having a drill bit receiving end portion and a driven end portion. The assembly is formed by a plurality of releasably engageable drill rod members connected in end to end relation. The drill rod members each include a shank end portion, a socket end portion and a body portion extending between the shank end portion and the socket end portion. The shank end portion of one drill rod member is releasably engageable in the socket end portion of an adjacent drill rod member. The shank end portion has an external surface with a twisted configuration forming a plurality of faces revolving about the axis of the shank end portion. The socket end portion has an internal bore with a twisted configuration forming a plurality of faces revolving about the axis of the socket end portion. The shank end portion of each drill rod member is insertably received in the socket end portion of an adjacent drill rod section. The shank end portion faces are positioned in abutting parallel relation with the socket end portion faces so that, upon application of torque to the tubular assembly, the abutting faces are urged into increasing frictional engagement to prevent separation of the connected drill rod members.

Further in accordance with the present invention, there is provided drilling apparatus that includes a drill chuck having a bore. A cutter bit driving element includes a shaft portion terminating at one end in a shank portion. The shank portion is releasably engageable in the drill chuck bore. The shank portion has an external surface with a twisted configuration forming a plurality of faces revolving about the axis of the shank portion. The drill chuck bore has a twisted configuration forming a plurality of faces revolving about the axis of the socket portion. The shank portion is insertably received in the drill chuck bore. The shank portion faces are positioned in abutting parallel relation with the drill chuck faces so that upon application of torque to the shank portion, the abutting faces are urged into increasing frictional engagement to prevent removal of the shank portion from the drill chuck bore.

Accordingly, the principal object of the present invention is to provide in rotary, percussion and combined rotary-percussion drilling apparatus a drill rod formed by a plurality of releasably engageable drill rod sections interconnected by mating shank and socket end portions, in a manner to facilitate efficient assembly and disassembly of a drill rod of a preselected length where the connected drill rod sections are restrained from separating when the drill rod is removed from a bore hole.

Another object of the present invention is to provide a plurality of interconnected drill rod sections forming an assembled drill rod of a preselected length having at one end a cutter bit attached thereto and at the opposite end a drive connection to a drill chuck where the drill rod sections between the drill chuck and the cutter bit are interchangeable to permit like drill rod sections to be added or deleted as required to drill a bore hole of a preselected length.

A further object of the present invention is to provide drilling apparatus that includes a drill rod assembly formed by a plurality of releasably engageable sections where the connection between the adjacent sections and the connection of the drill rod to a drill chuck is completed by the mating engagement of a convoluted shank received within a socket having a corresponding convoluted bore where the frictional engagement of the shank in the socket increases with the torque imparted to the drill rod.

These and other objects of the present invention will be more completely disclosed and described in the following specification, the accompanying drawings and the appended claims.

DESCRIPTION OF THE PREFERRED EMBODIMENT

Figure 1:
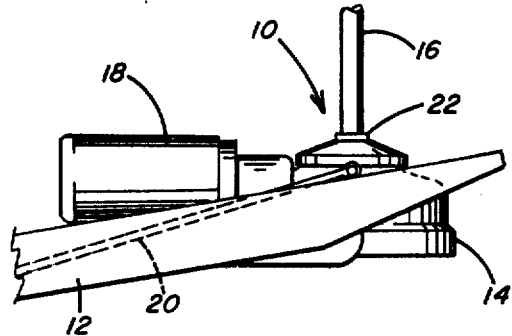
FIG. 1 is a schematic illustration of a boom supported drill head assembly for rotating the improved drill rod assembly and chuck of the present invention.
Figure 2:
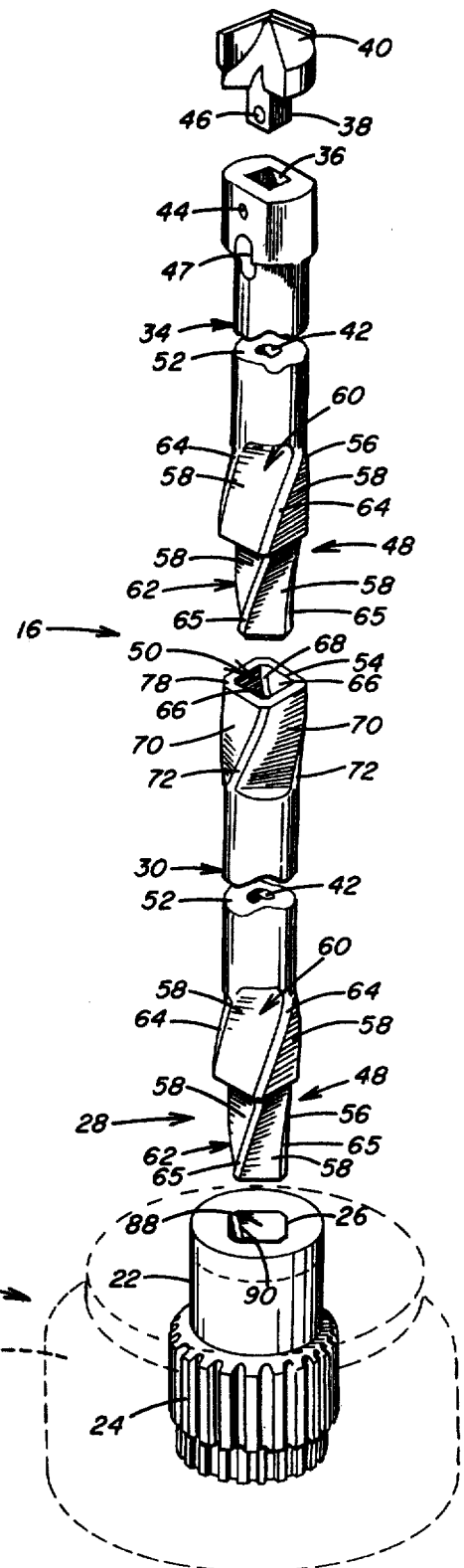
FIG. 2 is an exploded, fragmentary, isometric view of the drill rod assembly and drill chuck, illustrating the convoluted mating end portions for connecting the drill rod sections and the connection of the lowermost drill rod section to the drill chuck.

Referring to the drawings, and particularly to FIGS. 1 and 2, there is illustrated a drill generally designated by the numeral 10 supported on the forward end of a boom 12. The boom 12 is positioned at its opposite end for pivotal movement on a mobile drilling machine of the type illustrated and described in U.S. Pat. No. 3,190,369. The boom is slidably supported on the frame of the mobile drilling machine. A linkage connects the boom to the frame so that, as the boom is pivoted upwardly, the rear end of the boom slides on the frame to produce vertical linear movement of the boom forward end portion and the drill 10.

The drill 10 is pivotally mounted by trunnions on the boom forward end portion. The drilling thrust is delivered to the drill 10 from the boom through the trunnions. The drill 10 includes a housing 14 which rotatably supports a drill rod assembly 16 having a cutter bit connected to the upper end portion thereof. The drill rod assembly 16 is rotated at a preselected speed by a motor 18, such as a hydraulic motor, that is connected to the housing 14. A leveling linkage 20 connected to the drill 10 and the linkage for raising and lowering the boom 12 is operable to maintain vertical positioning of the drill rod assembly 16 as the drill boom 12 is raised and lowered to thereby drill a substantially vertical bore hold in a mine roof.

Figure 4:
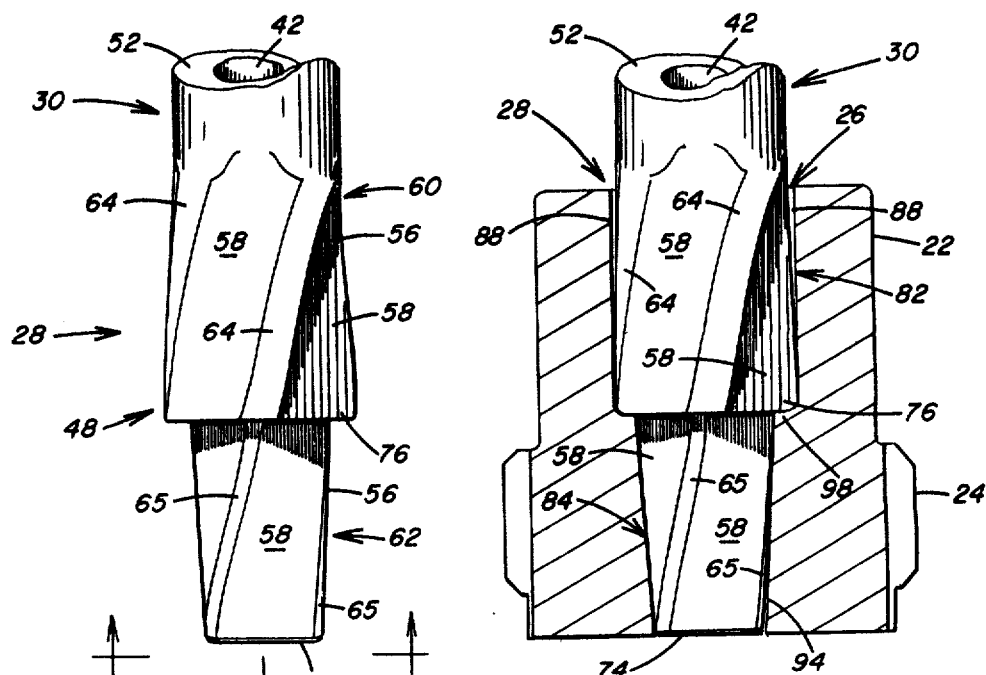
FIG. 4 is an exploded view, partially in section, of the end of a drill rod section and the drill chuck for receiving the drill rod section, illustrating the mating helical convolutes on the rod end portion and in the drill chuck bore.
Figure 7:
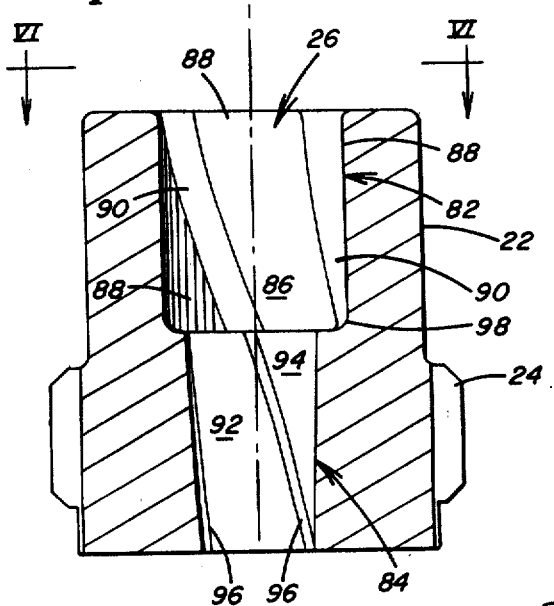
FIG. 7 is an enlarged sectional view, in side elevation, of the drill rod in the drill chuck, illustrating the helical surfaces of the drill rod shank engaged with the helical surfaces of the drill chuck bore.
Figure 6:
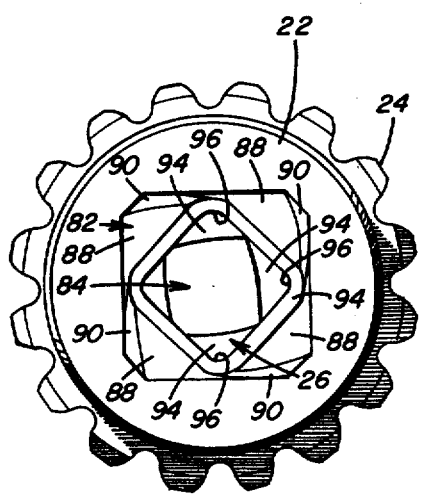
FIG. 6 is a view of the drill chuck, taken along line VI—VI of FIG. 4, illustrating a socket having a plurality of helical faces for receiving the corresponding helical faces on the end of the drill rod to drivingly connect the drill chuck to the drill rod.

The drill 10 includes a drill chuck 22 schematically illustrated in FIG. 2 and also illustrated in FIGS. 4, 6 and 7. In a manner (not shown) known in the art, the motor 18 is drivingly connected through an arrangement of meshing gears to a spindle having an internally splined bore for receiving splines 24 of the drill chuck 22. In this manner, rotation is transmitted from the motor 18 to the drill chuck 22 to rotate the drill chuck 22 in the housing 14. Thus, the chuck 22 is continuously rotated at a preselected speed. The present invention is operable with a drill 10 capable of performing either rotary, percussion or combined rotary and percussion drilling.

The drill chuck 22 includes an internal socket 26. The socket 26 has a preselected configuration adapted to drivingly receive a drive end portion generally designated by the numeral 28 of the drill rod assembly 16. The drive end portion 28 has an external configuration that corresponds to the internal configuration of the chuck socket 26 so as to drivingly connect the drill rod assembly 16 to the drill chuck 22.

The drill rod assembly 16 includes a plurality of releasably engageable drill rod members or sections. A single drill rod section 30 is illustrated in FIG. 2; however, it should be understood that more than one section 30 can be utilized to extend the drill rod assembly 16 to the desired length. The drill rod sections 30 are adapted for connection in end to end relation to extend from the drive end portion 28 to a cutter bit receiving section generally designated by the numeral 34. The cutter bit receiving section 34 has a socket 36 for slidably receiving a shank 38 of a cutter bit 40. The drill rod assembly 16 may include an axial passageway 42 that extends downwardly through each of the drill rod sections 30 from the bit receiving section 34 to the drive end portion 28. The passageway 42 communicates with the drill chuck socket 26 and a passageway (not shown) extending through the drill chuck 22. With this arrangement, dust and cuttings dislodged during the bore drilling operation are conveyed downwardly through the passageway 42 by a dust collecting system associated with the drill 10.

A transverse passageway 44 extends through the drill bit receiving end portion 34 and communicates with the axial passageway 42. The cutter bit shank 38 also includes a transverse passageway 46, which is aligned with the rod end portion transverse passageway 44 when the shank 38 is in an operative position within the socket 36. In a well known manner, a pin member (not shown) extends through the aligned transverse passageways 44 and 46 to secure the cutter bit shank 38 in the drill rod socket 36 so that the cutter bit 40 is rotated by the drill rod assembly 16. Also, as well known in the art, the drill bit receiving section 34 includes a port 47 opening into the drill rod axial passageway 42 for the flow of dust and cuttings under a vacuum force into the passageway 42. The drill rod drive end portion 28 is connected to a suction pump that generates a vacuum force so that the rock cuttings and dust flow into the port 47 and through the passageway 42 to a suitable dust collecting means.

The drill rod sections 30 are progressively added to the drill rod assembly 16 as the bore hole is developed during the drilling operation. The number of sections 30 added to the drill rod assembly 16 is determined by the depth to which the bore is drilled. It is also the conventional practice in mine roof drilling operations to begin the bore hole with a starter steel which includes, for example, a relatively short length of a drill rod section 30 and an associated cutter bit. The starter steel includes a shank inserted within the chuck socket 26 and drivingly connected to the drill chuck 22. The bore hole is initially drilled with the starter steel and thereafter the boom 12 is lowered and the starter steel and associated cutter bit are removed from the drill chuck 22. A first drill rod section 30, with the associated cutter bit 40 attached, is inserted in the drill chuck socket 26. The bore hole is drilled, and a succession of drill rod sections 30 are added to the drill rod assembly 16 between the drill bit receiving section and the drive end portion 28 in order to drill the bore hole to the desired depth.

In accordance with the present invention, each of the adjacent drill rod sections 30 is connected in the same manner. Each section 30, as well as the starter steel, is adapted for connection to the drill chuck 22 so that the drill rod sections 30 may be interchanged and assembled in any order between the drive end portion 28 and the bit receiving end section 34. This avoids the need for distinct drill rod sections for example, a single drill rod section adapted only to engage the drill chuck 22. The interchangeability of the drill rod sections 30 eliminates the need to maintain a large inventory of drill rod components as with the known arrangements which require a drive component distinct from the intermediate rod components and a finisher component which serves as a holder for the cutter bit.

Each drill rod section 30, as illustrated in FIG. 2, includes a shank end portion generally designated by the numeral 84. A socket end portion generally designated by the numeral 50 and a body portion generally designated by the numeral 52 extending between the shank end portion 48 and the socket end portion 50. The shank end portion 48 of each drill rod section 30 is releasably engageable with the drill chuck socket 26. The socket end portion 50 of each drill rod section 30 drivingly receives the shank end portion 48 of an adjacent drill rod section 30. The connection of a shank end portion 48 in a socket end portion 50 is completed in a manner which restrains the connected drill rod sections 30 from being pulled apart, particularly in the course of removing the drill rod assembly 16 from the bore hole. This is accomplished without the need for positioning pins in aligned holes of the connected sections or the use of wires, couplings or the like and the tools conventionally required to complete the assembly of drill rod components.

The shank end portion 48 of each drill rod section 30 has a twisted configuration. Each socket end portion 50 has an internal bore 54 of a twisted configuration corresonding to the twisted configuration of the shank end portion 48. With this arrangement, the opposed surfaces on the shank end portion 48 and in the socket end portion 50 are frictionally engaged to drivingly connect the shank end portion 48 and the socket end portion 50. The twisted configurations of the shank end portion 48 and socket end portion 50 are operable to drivingly connect the drill rod sections 30 so as to restrain the sections 30 from being pulled apart as the drill rod assembly 16 is lowered from the drilled bore hole. The feature of the twisted configuration of the mating surfaces provides for increased frictional engagement of the opposed surfaces upon the application of torque to the drill rod assembly 16. This occurs as rotation is transmitted to the drill rod assembly 16, as well as, during retrieval of the drill rod 16 from a bore hole by frictional engagement of the rod 16 with the wall of the bore hole.

It is during retrieval of a drill rod assembly from the bore hole when separation of the drill rod sections becomes a problem. With the present invention, when a section 30 binds against the bore hole wall the resistive torque applied to one drill rod section 30 is transmitted from the respective end portions 48 and 50 to the opposed surfaces on the end portions 48 and 50 on an adjacent drill rod section 30 to increase the frictional engagement between the connected drill rod sections. Thus, as the binding engagement of a drill rod section 30 with the bore hole wall increases, the forces acting to maintain the drill rod sections 30 connected increases to restrain separation of the connected drill rod sections 30.

FIG. 4, illustrates the details of the twisted configuration of the shank end portion 48 of the drill rod section 30 that is received within the socket 26 of the drill chuck 22. The details of the shank end portion 48 illustrated in FIG. 4 also apply to the structure of the shank end portions 48 for the other drill rod sections 30 of the drill rod assembly 16. Each shank end portion 48 has a twisted configuration with a surface 56 in the shape of a helical convolute. A plurality of helical faces 58 is formed on the surface 56 and the faces 58 revolve about the axis of the shank end portion 48.

It should also be understood that the connection of the cutter bit 40 to the rod cutter bit receiving section 14 can be accomplished by engagement of mating helical surfaces 30. In accordance with the present invention, the cutter bit shank 38 includes a twisted configuration forming a surface in the shape of a helical convolute. Also, the socket 36 of rod section 34 has an internal bore surface in the shape of a helical convolute adapted to receive in mating engagement the shank 38. This eliminates the need for a specially constructed finisher component.

Figure 5:
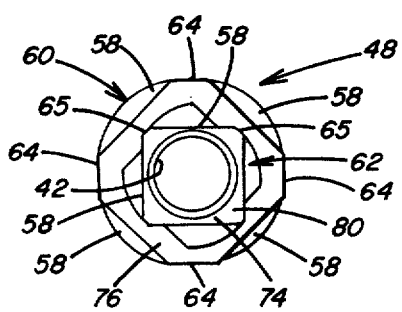
FIG. 5 is a view of the drill rod section taken along line V—V of FIG. 4, illustrating a rectangular bearing surface on the convoluted shank end portion of the drill rod.

Preferably, as illustrated in FIGS. 2, 4 and 5, each shank end portion 48 includes an enlarged portion generally designated by the numeral 60 that is formed integral with the body portion 52 and a reduced portion generally designated by the numeral 62 that is adapted to be received within the socket end portion 50 of an adjacent drill rod section, as well as in the drill chuck socket 26. The enlarged and reduced portions 60 and 62 are axially aligned and the drill rod axial passageway 42 extends therethrough. The helical convolute formed on the shank end portion 48 extends from the enlarged portion 60 onto the reduced portion 62 and to the end of the reduced portion 62. The helical convolute extends a preselected length on the enlarged portion 60 to the body portion 52. The helical convolute revolves about the axis of the shank end portion 48 at a preselected angle, thereby forming a preselected helical lead. The lead on the enlarged helical portion 60 corresponds to the lead on the reduced helical portion 62 even though the diameters of the helical portions 60 and 62 differ. The lead is the same for both portions 60 and 62 even though the angle of the helix on the enlarged portion 60 is greater than the angle of the helix on the reduced portion 62. Thus, there is no interruption in the twisted or helical pattern from the enlarged portion 60 to the reduced portion 62. An example lead of the helical convolute formed on the portions 60 and 62 is one revolution about the axis of the shank end portion 48 per linear foot of the drill rod section 30.

The helical faces 58 on both portions 60 and 62 are separated from one another by ridges 64 and 65 respectively also revolving about the axis of the shank end portion 48. Thus, the ridges 64 and 65 define flats which form the helical faces 58 on the shank end portion 48. The ridges 64 and 65 have a helical lead which corresponds to the helical lead of the faces 58 on the portions 60 and 62. The width of the helical ridges 64 on the enlarged portion 60 is greater than the width of the helical ridges 65 on the reduced portion 62 as seen in FIG. 4.

In the assembled drill rod 16, the reduced helical portion 62 is insertably received within the bore 54 of an adjacent drill rod socket end portion 50. As seen in FIG. 2, the bore 54 has a twisted configuration and in particular, the surface of the bore 54 is a helical convolute corresponding to the helical convolute formed on the reduced portion 62 of the rod section end portion 48. Thus, the bore 54 includes a plurality of helical faces 66 separated from one another by helical ridges 68 where the lead of the helical faces 66 and the helical ridges 68 corresponds to the lead of the helical faces 58 and the helical ridges 65 on the reduced portion 62 of the rod section shank end portion 48. It should be understood further that the helix on both the shank end portion 48 and within the socket end portion 50 advances at a preselected angle, for example at about 14°, and in a preselected direction about the axis of the respective drill rod section, i.e. either clockwise or counterclockwise. Thus, the helical pattern on the shank end portion 48 corresponds to the helical pattern within the socket end portion 50.

With the above described arrangement, the shank end portion 48 is inserted within an adjacent socket end portion 50 whereby the shank helical faces 58 are positioned in abutting parallel relation to the socket helical faces 66. Initially, the shank helical ridges 65 are positioned oppositely of the socket helical ridges 68. By turning the shank end 48 in the direction of the helical angle, the helical ridges 65 engage the helical ridges 68 to cam the opposed helical faces 58 and 66 into abutting relation. Engagement of helical faces 58 and 66 generates rotation of the shank end portion 48 as it is inserted into the socket end portion 50. When the shank end portion 48 is bottomed in the socket end portion 50, the helical faces 58 and 66 are oppositely positioned in parallel abutting relation along the entire lengths thereof. Alignment of the ridges 65 with the ridges 68 assures mating engagement of the helical faces 58 and 66.

In the assembly of the drill rod sections 30, the enlarged helical portion 60 on the shank end portion 48 does not extend into the helical bore 54 of an adjacent drill rod section. As seen in FIG. 2, the external surface of the socket end portion 50 is also provided with an outer twisted surface to form a helical convolute corresponding to the helical convolute on the shank end portion 48. The socket end portion 50 is thus provided with a plurality of outer helical faces 70 separated from one another by helical ridges 72. The lead of the helical faces 70 is the same as the lead of the helical faces 58 and the lead of the helical ridges 72 is the same as the lead of the helical ridges 64.

The provision of the external helical configuration at the connection of adjacent drill rod sections 30 promotes the flow of air upwardly in the bore hole between the outer surface of the drill rod assembly 16 and the bore hole wall. Air is drawn upwardly around the drill rod assembly 16 due to the vacuum within the passageway 42. This provides circulation of air upwardly through the bore hole and downwardly through the passageway 42 for the conveyance of dust and cuttings through the passageway 42 and out of the bore hole.

Referring to FIGS. 4 and 5, a shoulder 76 separates the enlarged portion 60 from the reduced portion 62 on the shank end portion 48. The socket end portion 50, as shown in FIG. 2, has a bearing surface 78 which extends around the immediate opening into the bore 54. Preferably, the bearing surface 78 is rectangular or square in configuration and has opposed parallel edges which form the bearing surface 78. Similarly, the shank 48 terminates in an outer end portion 74 which has a non-circular configuration formed by opposed parallel edges to provide a bearing surface 80 as illustrated in FIG. 5.

In the assembled arrangement of connected drill rod sections 30, the bearing surface 80 preferably abuts the bottom of the bore 54 in the socket end portion 50. The shoulder 76 abuts the bearing surface 78 on the socket end portion 50. With this arrangement, the helical convolute on the surface 56 of shank end portion 48 continues without interruption onto the socket end portion 50.

The connection of the drive end portion 28 of the drill rod assembly 16 to the drill chuck 22 is accomplished in a manner similar to the drive connection between the adjacent drill rod sections 30, as above described. As illustrated in FIGS. 4, 6 and 7, the socket 26 of the drill chuck 22 has a twisted configuration corresponding to the twisted configuration of the shank end portion 48 of each of the respective drill rod sections 30. The socket 26, as illustrated in FIG. 4, includes an enlarged portion 82 for receiving the shank enlarged portion 60 and a reduced portion 84 for receiving the shank reduced portion 62.

The enlarged portion 82 includes an internal surface 86 with a helical convolute formed thereon providing a plurality of helical faces 88 separated by helical ridges 90. The lead of the helical faces 88 corresponds to the lead of the helical ridges 90. Similarly, the lead of the helical faces 88 and helical ridges 90 corresponds to the lead of the helical faces 58 and helical ridges 64 respectively on the socket enlarged portion 60. Also in accordance with the present invention, the socket reduced portion 84 includes an internal surface 92 that is a helical convolute formed by a plurality of helical faces 94 separated from one another by helical ridges 96. The lead of the helical faces 94 and ridge 96 on the socket reduced portion 84 corresponds to the lead of the helical faces 88 and ridges 90 on the socket portion 82 respectively to form a continuous helical pattern within the drill chuck socket 26. Also, as illustrated in FIG. 4, the socket enlarged portion 82 is separated from the socket reduced portion 84 by a shoulder 98 adapted to receive the shoulder 76 of the shank end portion 48 of a drill rod section 30 that forms the drive end portion 28 of the drill rod assembly 16.

The drive connection of a drill rod shank end portion 48 at the drive end portion 28 of the drill rod assembly 16 is illustrated in FIG. 7. The drive end portion 28 is inserted in the drill chuck socket 26 by guiding the shank reduced portion 62 into the socket reduced portion 84 with the shank helical faces 58 in opposed parallel relation with the socket helical faces 88. In this manner, the shank helical ridges 64 and 65 are moved into engagement with the socket helical ridges 90 and 96 respectively. As the shank end portion 48 is lowered into the socket 26, the engagement of the respective helical faces promotes rotation of the shank end portion 48 in the drill chuck socket 26. The opposed helical faces 58 and 94 engage one another in abutting parallel relation thereby completing the drive connection of the drill rod drive end portion 28 to the drill chuck 22.

In one embodiment of the present invention, the shank end portion 48 is constructed with the shank reduced portion 62 having a length greater than the length of the shank enlarged portion 60 and the depth of the chuck socket portion 84. This assures that the shank reduced portion 62 engages the chuck socket portion 84 before the shank enlarged portion 60 engages the chuck socket portion 82. The same arrangement is accomplished by providing the chuck socket portion 82 with a depth less than the depth of the chuck socket portion 84. Also, the shank enlarged portion 60 need not be completely inserted within the chuck socket portion 82 to complete the drive connection. As long as the shank reduced portion 62 is engaged with the chuck socket portion 84, the drive connection is complete.

Figure 3:
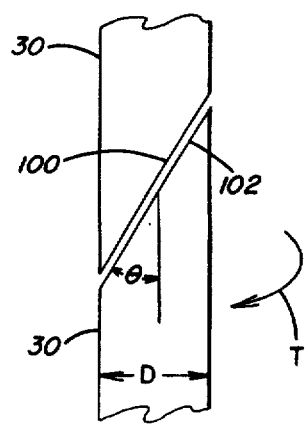
FIG. 3 is a schematic representation of the mating engagement of the ends of adjacent drill rod sections by the abutting contact of opposed helical surfaces on adjacent drill rod sections.

As rotation is transmitted to the shank end portion 48, the opposed helical surfaces 58 and 66 of connected drill rod sections 30 are brought into increased frictional engagement to resist separation. The opposed helical surfaces 58 and 66 of connected drill rod sections 30 thus become wedged together. The wedging engagement of the ends of connected drill rod sections 30 is illustrated in FIG. 3. The opposed surfaces wedged together are schematically shown and designated by numerals 100 and 102 in FIG. 3. The helix angle is indicated as $\theta$ and its magnitude is selective as determined by such factors as the coefficient of friction between the opposed surfaces 100 and 102, the lead of the helix, the dimension D of each drill rod section 30, and the torque T acting on the sections 30. With this arrangement, frictional engagement of a shank end portion 48 within the drill chuck 22, as well as the engagement of the adjacent drill rod sections, increases as the frictional forces between the drill rod sections and the wall of the bore hole increase. Thus, as the forces tending to separate the drill rod sections from one another and from the drill chuck 22 increase, the resistance to separation increases by the wedging engagement of the opposed helical faces. This is accomplished without the need for connecting pins, wires or couplings.

Further in accordance with the present invention, the socket end portion 50 of each drill rod section 30 is adapted for insertion in the drill chuck socket 26. With this arrangement, the rod helical faces 70 and ridges 72 frictionally engage the socket helical faces 88 and ridges 90 respectively. Thus, with reference to FIG. 2, the rod socket end portion 50 is positioned at the drive end portion 28 of the drill rod assembly 16. Then the rod shank end portion 48 is arranged to receive the socket end portion 50 of an adjacent drill rod section 30. This arrangement permits the drill chuck socket 26 to receive either the rod shank end portion 48 or the rod socket end portion 50, thereby further adding to the efficiency in connecting rod sections 30 to each other and to the drill chuck 22.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A drill rod for rotary drilling comprising, an assembly of drill rod members, said assembly having a drill bit receiving end portion and a driven end portion, said assembly being formed by a plurality of releasably engageable drill rod members connected in end to end relation, said drill rod members each including a shank end portion, a socket end portion and a body portion extending between said shank end portion and sad socket end portion, said shank end portion of one drill rod member being releasably engageable in said socket end portion of an adjacent drill rod member, means positioned on the external surface of said respective drill rod members for promoting the flow of air on the external surface of the drill rod adjacent the connection of one drill rod member to another, said shank end portion having an external surface with a twisted configuration forming a plurality of faces revolving about the axis of said shank end portion, said shank end portion including an enlarged portion and a reduced portion, said twisted configuration extending in a continuous angular pattern on said enlarged portion and said reduced portion to provide a plurality of continuous angular faces extending on said enlarged portion and said reduced portion, said socket end portion having an internal bore with a twisted configuration forming a plurality of faces revolving about the axis of said socket end portion, said shank end portion of each drill rod member being insertably received in said socket end portion of an adjacent drill rod member, said shank end portion reduced portion being drivingly received within said socket end portion internal bore, said socket end portion having an external surface with a twisted configuration forming a plurality of external faces extending in an angular pattern about the axis of said socket end portion, and said shank end portion faces being positioned in abutting parallel relation with said socket end portion faces so that upon application of torque to said assembly said abutting faces are urged into increasing frictional engagement to prevent separation of said connected drill rod members.

2. A drill rod as set forth in claim 1 which includes, said external faces extending in a helical pattern formed by said twisted configuration on said shank end portion, a plurality of helical faces formed by said twisted configuration within said internal bore of said socket end portion, said helical faces of said shank end portion and said socket end portion having a preselected helical lead in a preselected direction, and said helical lead of said shank end portion helical faces corresponding to said helical lead of said socket end portion helical faces so that said helical faces positioned in opposed relation frictionally engage to resist separation upon application of torque to said drill rod.

3. A drill rod as set forth in claim 1 which includes, said shank end portion and said socket end portion each having a longitudinal axis, and said shank end portion and said socket end portion having said twisted configuration extending around said respective longitudinal axes thereof at a constant preselected helix angle to form a helical convolute on said shank end portion and within said socket end portion internal bore.

4. A drill rod as set forth in claim 1 which includes, said faces formed by said twisted configuration on said shank end reduced portion forming helical faces, a plurality of helical faces formed by said twisted configuration within said internal bore of said socket end portion, and said shank end reduced portion helical faces having a length corresponding to the depth said socket end portion helical faces extend into said internal bore.

5. A drill rod as set forth in claim 1 in which, said shank end portion has a preselected length corresponding to the depth of said socket end portion internal bore, said shank end portion having a transverse dimension less than the transverse dimension of said body portion to form a shoulder on said body portion above said shank end portion, and a bearing surface surrounding said internal bore on said socket end portion for receiving said shoulder to rigidify the connection between adjacent drill rod members.

6. A drill rod as set forth in claim 1 in which, said shank end portion angular faces providing said shank end portion with a noncircular cross section, said socket end portion twisted configuration forming a plurality of angular faces within said internal bore so that said socket end portion is provided with a noncircular cross section corresponding to said noncircular cross section of said shank end portion, and said shank end portion being received within said socket end portion such that said angular faces engage one another upon rotation of said drill rod members to restrain separation of said connected drill rod members.

7. A drill rod as set forth in claim 1 in which, said faces on said shank end portion and within said socket end portion internal bore extend at a preselected angle in a preselected direction, said faces on said shank end portion terminating in a noncircular profile having opposed edges, and said faces on said socket end portion forming a noncircular aperture into said internal bore having opposed edges for receiving in abutting relation said opposed edges on said shank end portion.

8. A drill rod as set forth in claim 7 in which, said shank end portion opposed edges are positioned in parallel relation, and said socket end portion opposed edges being positioned in parallel relation to slidably receive said shank end portion opposed edges.

9. A drill rod as set forth in claim 1 in which, said faces on said shank end portion form a helical convolute on the surface of said shank end portion, said helical convolute having a preselected helical lead and angle, and said faces being separated from one another by ridges extending at a helical lead and angle corresponding to said helical convolute.

10. A drill rod as set forth in claim 1 in which, said faces within said internal bore form a helical convolute within said socket end portion, said helical convolute having a preselected helical lead and angle, and said faces being separated from one another by ridges extending at a helical lead and angle corresponding to said helical convolute.

11. A drill rod as set forth in claim 1 which includes, means provided on said shank end portion and within said socket end portion for guiding said respective faces into abutting relation to frictionally engage said shank end portion within said socket end portion.

12. A drill rod as set forth in claim 11 in which, said means for guiding said respective faces into abutting relation includes a plurality of ridges on said shank end portion and within said socket end portion, said ridges separating said respective faces and extending at a preselected angle on the surface of said shank end portion and within said internal bore of said socket end portion, and said ridges on said shank end portion being engageable with said ridges within said socket end portion to guide said respective faces into abutting frictional engagement upon rotation of said connected drill rod members.

13. A drill rod as set forth in claim 1 in which, said faces on the surfaces of said connected drill rod members are adapted to facilitate the flow of air in a bore hole between said drill rod and the wall of the bore hole.

14. Drilling apparatus comprising, a drill chuck having a bore, a cutter bit driving element including a shaft portion terminating at one end in a shank portion, said shank portion being releasably engageable in said drill chuck bore, said shank portion having an external surface with a twisted configuration forming a plurality of faces revolving about the axis of said shank portion, said shank portion including an enlarged portion and a reduced portion, said drill chuck bore having a twisted configuration forming a plurality of faces revolving about the axis of said bore, said drill chuck bore including an enlarged portion and a reduced portion, said twisted configuration extending in a continuous angular pattern on said enlarged portions and said reduced portions of said drill chuck bore and said shank portion respectively to provide a plurality of continuous angular faces extending on said enlarged portions and said reduced portions, said angular faces on said shank portion enlarged and reduced portions extending at a preselected helical angle to form a continuous helical pattern from said enlarged portion to said reduced portion, said angular faces in said drill chuck bore enlarged and reduced portions extending at a preselected helical angle to form a continuous helical pattern in said drill chuck bore from said enlarged portion to said reduced portion, and said continuous helical pattern of said shank enlarged and reduced portions corresponding to said continuous helical pattern of said drill chuck bore enlarged and reduced portions respectively so that said shank portion and said drill chuck bore angular faces are positioned in opposed mating relation to drivingly connect said cutter bit driving element to said drill chuck.

15. Drilling apparatus as set forth in claim 14 which includes, a plurality of helical faces formed by said twisted configuration on said shank portion, a plurality of helical faces formed by said twisted configuration within said drill chuck bore, said helical faces of said shank portion and said drill chuck bore having a preselected helical lead in a preselected direction, and said helical lead of said shank portion helical faces corresponding to said helical lead of said drill chuck bore helical faces so that said helical faces positioned in opposed relation frictionally engage to resist separation of said cutter bit driving element from said drill chuck.

16. Drilling apparatus as set forth in claim 14 which incudes, said shank portion and said drill chuck bore each having a longitudinal axis, and said shank portion and said drill chuck bore having said twisted configuration extending around said respective longitudinal axes thereof at a constant preselected helix angle to form a helical convolute on said shank portion and within said drill chuck bore.

17. Drilling apparatus as set forth in claim 14 in which, said shank portion twisted configuration forms a plurality of angular faces on said shank portion so that said shank portion is provided with a noncircular cross section, said drill chuck bore twisted configuration forming a plurality of angular faces within said drill chuck bore so that said drill chuck bore is provided with a noncircular cross section corresponding to said noncircular cross section of said shank portion, and said shank portion being received within said drill chuck bore such that said angular faces engage one another upon rotation of said drill chuck to restrain separation of said cutter bit driving element from said drill chuck.

18. Drilling apparatus as set forth in claim 14 in which, said faces on said shank portion form a helical convolute on the surface of said shank portion, said helical convolute having a preselected helical lead and angle, and said faces being separated from one another by ridges extending at a helical lead and angle corresponding to said helical convolute.

19. Drilling apparatus as set forth in claim 14 in which, said faces within said drill chuck bore form a helical convolute within said drill chuck bore, said helical convolute having a preselected helical lead and angle, and said faces being separated from one another by ridges extending at a helical lead and angle corresponding to said helical convolute.

20. Drilling apparatus as set forth in claim 14 which includes,
means provided on said shank portion and within said drill chuck bore for guiding said respective faces into abutting relation to frictionally engage said shank portion within said drill chuck bore.

21. Drilling apparatus as set forth in claim 20 in which,
said means for guiding said respective faces into abutting relation includes a plurality of ridges on said shank portion and within said drill chuck bore,
said ridges separating said respective faces and extending at a preselected angle on the surface of said shank portion and within said drill chuck bore, and
said ridges on said shank portion being engageable with said ridges within said drill chuck bore to guide said respective faces into abutting frictional engagement upon rotation of said drill chuck.

22. A drill chuck comprising,
a body portion having a longitudinal rotational axis,
a bore extending through said body portion,
said bore having a twisted configuration forming a plurality of drive faces revolving about said axis,
said drive faces extending at a preselected angle in a preselected direction along said bore,
said bore including an enlarged portion and a reduced portion,
said twisted configuration extending in a continuous angular pattern on said enlarged and reduced portions of said bore, and
said angular pattern on said bore enlarged portion corresponding to said angular pattern on said bore reduced portion so that the angle of twist on said enlarged portion conforms to the angle of twist on said reduced portion to provide a plurality of continuous angular faces extending on said enlarged and reduced portions of said bore.

23. A drill chuck as set forth in claim 22 which includes,
a plurality of helical faces formed by said twisted configuration within said bore, and
said helical faces having a preselected helical lead.

24. A drill chuck as set forth in claim 23 in which,
said twisted configuration of said bore extends around said axis at a preselected helix angle to form a helical convolute within said bore.

* * * * *